United States Patent [19]

Grey

[11] 4,114,403
[45] Sep. 19, 1978

[54] COUPLINGS

[75] Inventor: John Constantine Grey, Osterley, England

[73] Assignee: Thorpenco (Sales & Service Ltd.), England

[21] Appl. No.: 757,243

[22] Filed: Jan. 6, 1977

[30] Foreign Application Priority Data

Jan. 7, 1976 [GB] United Kingdom .................. 442/76
Mar. 25, 1976 [GB] United Kingdom ............. 11940/76

[51] Int. Cl.² .......................... F16D 3/14; F16D 3/52
[52] U.S. Cl. ..................................... 64/15 B; 64/27 B
[58] Field of Search ..................... 64/15 B, 27 B, 12; 403/150, 151, 152, 161

[56] References Cited

U.S. PATENT DOCUMENTS 1,712,219  5/1929  Knudsen .............................. 64/15 B
2,478,953  8/1949  Tint ......................................... 64/12

FOREIGN PATENT DOCUMENTS 1,301,941  8/1969  Fed. Rep. of Germany .......... 64/15 B
1,373,823  11/1974  United Kingdom ..................... 403/151

Primary Examiner—Benjamin W. Wyche
Assistant Examiner—R. C. Turner
Attorney, Agent, or Firm—Cushman, Darby & Cushman

[57] ABSTRACT

A flexible rotary coupling for accommodating axial and/or angular misalignment between shafts comprises end bosses for the respective shafts, each boss having a diametrical slot and the slots facing each other to receive the ends of a platelike rigid intermediate member that transmits the torque between the shafts. The ends of the member are inserted in resilient liners in the slots and the liners can deform to accommodate shaft misalignment while the torque load places the liner material in compression. The intermediate member can be slid transversely out of the slots to disconnect the coupling without disturbing the shafts.

8 Claims, 9 Drawing Figures

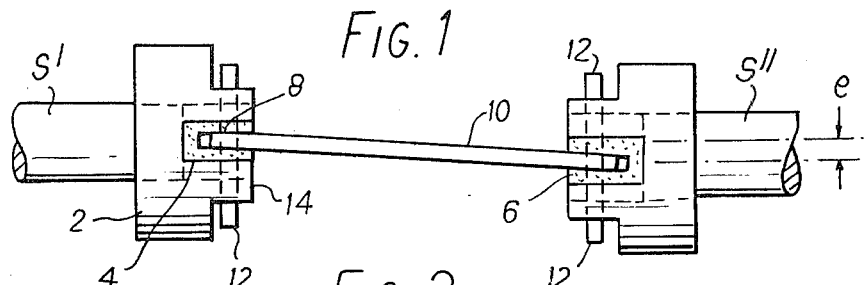
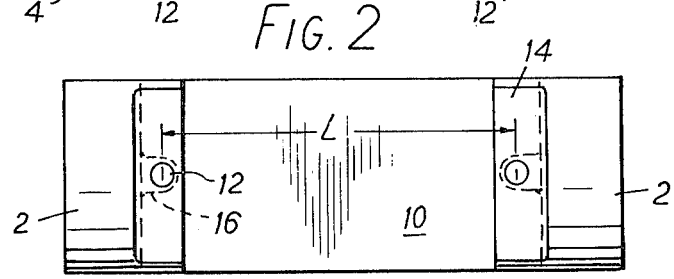
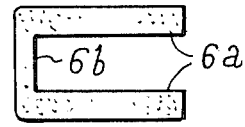 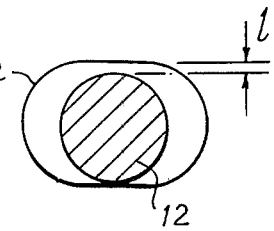
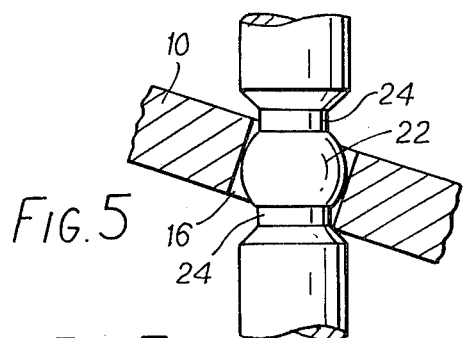 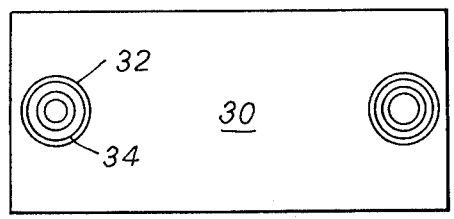
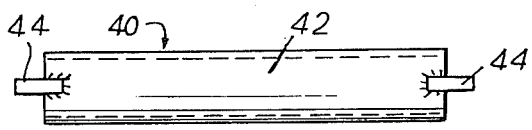 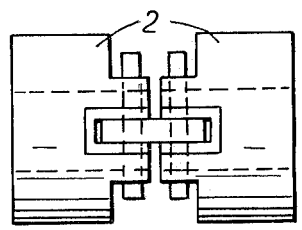
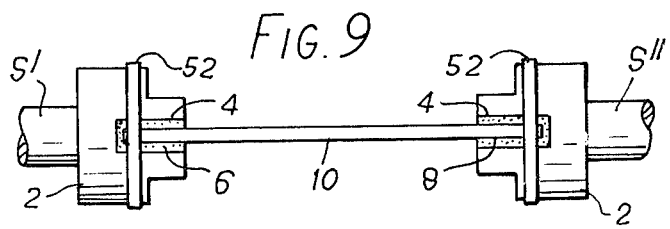

COUPLINGS

FIELD OF THE INVENTION

This invention relates to flexible rotary couplings for connecting together shafts that are in a state of misalignment.

BACKGROUND OF THE INVENTION

It is often necessary to couple together shafts which are not precisely in alignment with each other or which are mounted in respective mechanisms that have some freedom of movement relative to each other, such that a rigid coupling of the shafts is impossible. Various forms of flexible couplings are known for use in these situations that are able to allow for both angular and parallel misalignment of the shafts.

One well-known arrangement is the coupling in which an intermediate shaft has universal joints of the Hooke or Cardan type at opposite ends connecting it to the respective shafts. Such a construction has a number of disadvantages, in particular as regards the minimum axial space required to accommodate the coupling and to permit its assembly and removal if the shafts to be coupled are already in place. It is also relatively complex and therefore expensive to produce, and its usefulness is generally confined to arrangements in which it is necessary to accommodate large misalignments.

It has also been proposed to provide a flexible coupling using an intermediate member that is itself of a flexible nature, in particular a group of leaf springs (U.S. Pat. No. 1,712,219) or a rubber tube (U.S. Pat. No. 2,908,150). Such constructions have the merit of simplicity but they must have a relatively large axial length to accommodate any significant misalignment. They are therefore cumbersome and are limited in the torque they can transmit and, moreover, because of the flexible nature of the intermediate member they can be unstable at high speeds of rotation.

SUMMARY OF THE INVENTION

In a flexible rotary coupling according to the present invention, there is an intermediate member of substantially rigid form and said member is held at its ends by resiliently yieldable elements that permit angular pivoting movements about axes transverse to the longitudinal axis between its ends and that are located in engagements that can be rigidly fixed to the respective shafts said elements comprising bearing surfaces for the intermediate member and their engagements that extend transversely of their respective shaft centres so as to permit insertion and withdrawal of the intermediate member in said transverse direction and causing a torque load on the coupling to be transmitted by compression of the material of the resilient elements between said engagements and the intermediate member.

An arrangement of this form is able to accommodate axial or angular shaft misalignments by resilient deflection of said yieldable elements without requiring deformation of the intermediate member. It is therefore possible to construct such a coupling for high speeds of rotation and for operation in any working attitude, while the intermediate member can be easily and quickly removed by virtue of its transverse displaceability, without moving the shafts. In addition, the angular misalignment that can be accommodated is independent of the length of the intermediate member so that it is possible to accommodate the coupling in a very short overall length.

The yieldable elements will conveniently be of a non-metallic, e.g. a rubbery, material so chosen that it is unnecessary to provide lubrication at their bearing faces. They are also capable of transmitting very high torque without rupture since the material is loaded in compression thereby.

In a particularly simple construction, the engagements are formed by diametrically directed slots that face each other from opposite ends of the coupling and the intermediate member is in the form of a plate or has plate-like end elements to be located within said slots, which are themselves lined by the resiliently yieldable elements. In this construction, both the intermediate member and the resilient elements can be removed and replaced without any disturbance of the two shafts, simply by sliding them out transversely of the shaft engagements.

The intermediate member may be so located in its resilient elements as to have freedom of axial movement in order to permit some relative axial displacement or end float between the coupled shafts, a function that cannot be easily achieved in the known coupling forms previously referred to.

Retaining elements may be provided to hold the intermediate member in place in the slots, with or without some limited freedom of movement such as for end float. Such retaining elements may project transversely through apertures in the intermediate member and, when axial movement is to be allowed the apertures can be elongated axially of the coupling, at least at one end of the member, to permit axial displacements of the member with respect to the respective retaining element or elements.

In high-speed applications it may be desirable to hold the intermediate member so that it is completely restrained from any movement transversely of its axis, in which case said retaining elements may comprise spherical portions that engage the apertures in the intermediate member to locate the member transversely while permitting pivoting movements about a longitudinal axis. In some applications, the required restraint of the intermediate members may be provided by bushes that are resiliently mounted in a manner known per se.

BRIEF DESCRIPTION OF THE DRAWINGS

The invention will be more particularly described with reference to the accompanying drawings, wherein:

FIGS. 1 and 2 are side and plan views respectively of a coupling according to the invention, FIG. 3 is a detail illustration of one of the resilient elements of the coupling in FIGS. 1 and 2, FIG. 4 is a detail illustration of one end attachment of the spacer member in the coupling of FIGS. 1 and 2, FIG. 5 illustrates a modified form of end attachment, FIGS. 6 and 7 illustrate modified forms of spacer member for a coupling according to the invention, FIG. 8 illustrates another coupling according to the invention, and FIG. 9 illustrates a modified form of retaining means in a coupling according to the invention.

DESCRIPTION OF THE PREFERRED EMBODIMENTS

Referring moe particularly to FIGS. 1 and 2, a pair of shafts S', S" to be connected together have bosses 2 rigidly fixed on their adjacent ends, each boss having a diametrical engagement slot 4, the faces of which are lined by a U-shaped insert 6 of resiliently flexible material. Extending between the opposed inserts and fitting snugly in the slotform seatings 8 that they provide is a rigid plateform spacer 10, retained in place by pins 12 fixed in the flanges 14 of the bosses that form each slot, the pins projecting through the side limbs 6a (FIG. 3) of the insert 6 and an aperture 16 in the spacer.

The inserts are conveniently of non-metallic flexible material, e.g. elastomers, artificial or natural rubbers, polymers, and generally materials exhibiting high compressive strength combined with some degree of flexibility and low hysteresis, for example a polyurethane such as that known under the trade name PRESCOLLAN of The Dunlop Rubber Co. Ltd. By virtue of the flexibility of the inserts 6 the arrangement described is able to accommodate an offset or parallel misalignment of the shafts as indicated at e. This flexibility is also able to accommodate some angular misalignment of the shaft axes. (The misalignment is shown in a somewhat exaggerated form, the maximum angular misalignment of the illustrated coupling being approximately 1° to 2°).

It may also be noted that the inserts are stressed in compression by the torque transmitted between the shafts and similarly they accommodate shaft misalignments by compressive deformation. They are thus able to accept high loadings without risk of rupture. The spacer between them can be effectively completely rigid and thus be of a size and shape to be only relatively lightly stressed by the torque load, while the pins 12 simply act as retaining members and do not carry any of the torque load.

The aperture 16 for each pin 12 opens into the adjacent end face of the spacer member which is thereby also capable of some axial movement or end float relative to the bosses 2: i.e. there is some latitude in the spacing of the shafts S', S'' axially of each other and/or some relative movement between the shafts in that direction is permissible. The ends of the spacer are not restrained as there is some spacing between them at the central webs 6b of the resilient inserts 6 so that the spacer is able to move relatively freely in this axial direction. It is also possible to operate in the same manner with closed but elongated apertures as indicated at 16a in FIG. 4. It would also be possible, however, to impose a resilient restraint by the central webs 6b of the inserts abutting the opposite ends of the spacer, in which case it may be desirable for the thickness of these portions to be somewhat greater than is shown in FIG. 3. In that figure, the limbs 6b of the insert are thicker than the central web, these being the elements that are required to yield sufficiently to accommodate misalignment of the shafts.

FIG. 4 shows closed but axially elongated apertures 16a for the retaining pins 12 that similarly allow some end float. This also shows the pin 12 with a small lateral clearance l in the aperture 16a. If the pin and aperture are straight-sided such a clearance is required to avoid interference between the pin and the plate because when the coupling is rotating with the shafts misaligned, in some angular positions the location of the pin axis relative to the plane of the plate will vary from the perpendicular. The presence of this lateral clearance can mean that the spacer will run out of centre and lie slightly laterally offset with respect to the pin, causing some rotating imbalance. If the speed of rotation is not too high this will normally be acceptable but at higher speeds it may be desirable not to have any lateral clearance.

In that case, each retaining pin may have the form shown in FIG. 5, with a spherical portion 22 between waisted portions 24 engaging the sides of the spacer aperture and allowing relative tilting between the pin and the plate as shown while maintaining contact with both sides of the pin aperture.

In some applications it is necessary to restrict to a minimum relative axial movement between the two shafts and/or to transmit a certain axial force from one shaft to the other, while allowing for angular and offset abutments betwen the two shafts. The location arrangement in FIG. 5 can clearly be modified so as to be effective also longitudinally of the spacer for this purpose, the closeness of fit of the spherical portion 22 to its aperture dimension longitudinally of the plate determining whether and to what extent there is relative axial movement possible.

When in some special cases it is necessary to avoid backlash or lost motion in the axial restraint a preferred arrangement is shown in FIG. 6 in which spacer 30 has two round apertures 32 in which are housed two steel-rubber flexible bushes 34 in which the pins are seated. These bushes can be of generally known form and are designed so that their angular flexibility is relatively low but their radial stiffness is high so that axial restraint between the shafts can be of a high order. Because of the support offered to the plate by the bushes, this arrangement is particularly suitable for large couplings.

The simple plate-form spacer of FIGS. 1 and 2 may be subject to vibration porblems if its length is too great, the limiting speed of rotation at which vibration occurs decreasing with increase of length, although the resilient inserts will have some damping effect tending to inhibit vibration of the spacer and so increasing its critical speed. Where vibration can be a problem, an alternative form of spacer can be used having a stiffer construction such as that shown in FIG. 7. The main length of the spacer 40 in this figure is formed by a tube 42, the stiffness of which is related to the length of the spacer and the operational speed of the coupling. At its ends, the tube has two co-planar rectangular plates 44 welded or brazed to it, these each being provided with apertures for retaining pins, as at the ends of the spacers already described so that the connection of the coupling can be made in precisely the same manner as the coupling of FIGS. 1 and 2 or any of the preceding variants.

It is also possible to construct a coupling according to the invention with a very small length, as is shown in FIG. 8 where the two bosses 2 are almost in contact. The amount of misalignment that can be accommodated will lessen as the length of the spacer is reduced, but the coupling shown in FIG. 8 will nevertheless have sufficient freedom of movement for many applications. The stiffness of the spacer is of special importance in this form of coupling because the twisting couple or torque about the longitudinal axis of the spacer results in a twisting couple about a transverse axis in the plane of the plate at right angles to the longitudinal axis. When the length of the spacer and the distance between the inner edges of the retaining pin apertures is small this second couple can produce significant stresses and a flexible spacer would be too weak.

It is a characteristic of all the forms of the invention described so far that the location of the spacer by parallel diametrical slots in the bosses allows the coupling to be assembled without dismantling the shafts themselves, although other advantages of the invention can be obtained without necessarily employing this feature. However ease of assembly is particularly valuable in shorter couplings such as that of FIG. 8, where known couplings of comparable size can be dismantled only with difficulty, if at all, without displacing or removing one of the shafts, but the facility has more general application to situations in which it would otherwise be necessary to move one of the machines interconnected by the coupling, or where the case of removal of the intermediate member provides a convenient way of disconnecting the coupled machines, e.g. to carry out maintenance work.

FIG. 9 of the drawing illustrates a further modification of the previously described examples. The construction is similar in many respects to that in FIGS. 1 and 2, but the spacer plate 10 is retained in the slots 4 by respective circumferential rings or bands 52 that grip the periphery of each boss 2 to overlap the open lateral sides of the slots. The rings 52 are able to be loosened when the spacer plate is to be removed being formed, for example, in the manner of known expandable hose clips.

It will be understood that the various modified details shown in the different drawings are capable of being employed in combination where they are not direct alternatives of each other.

What is claimed is:

1. A flexible rotary coupling for connecting together a pair of shafts in a state of misalignment, comprising respective end members for attachment rigidly to the respective shafts and an intermediate substantially rigid torque-transmitting member extending between the end members, resiliently yieldable elements being disposed between the intermediate member and the end members, said yieldable elements providing transversely extending seatings opening towards each other and into which respective ends of the intermediate member are transversely inserted and are transversely withdrawable, said yieldable elements comprising opposed bearing surfaces for yieldably supporting the respective inserted ends of the intermediate member and for permitting articulation of the intermediate member with respect to each shaft, said elements transmitting a torque load by resilient compression between their respective end members and the intermediate member, relative pitching movements between the intermediate member and each end member about an axis extending in said transverse direction also being accommodated by resilient compression of said elements between their respective end members and the intermediate member.

2. A flexible coupling according to claim 1 wherein said end members are provided with correspondingly transversely directed slots receiving said resilient elements and the resilient elements are in the form of U-shaped members lining the surfaces of each slot.

3. A flexible coupling according to claim 1 wherein retaining elements are provided on the end members for locating the intermediate member with respect to the seatings in at least one direction in the plane of said seatings.

4. A flexible coupling according to claim 3 wherein said retaining elements project through the seatings and apertures are provided in the intermediate member for receiving said elements, at least at one end of the intermediate member the aperture being elongated axially of the coupling for permitting axial displacements of the member with respect to the retaining element or elements associated therewith.

5. A flexible coupling according to claim 3 wherein apertures are provided in the intermediate member for receiving said retaining elements and spherical portions of the elements engage said apertures to limit relative movements between the intermediate member and the elements to pivoting movements.

6. A flexible coupling according to claim 3 wherein bushes resiliently mounted in the intermediate member receive the retaining elements for permitting relative angular movements therebetween.

7. A flexible coupling according to claim 1 wherein the intermediate member has at least opposite end portions formed as coplanar plate elements to be received in said yieldable elements.

8. A flexible rotary coupling for connecting together a pair of shafts in a state of misalignment comprising respective spaced end members for rigid connection to the shafts, a diametrically extending opening in each end member, a substantially rigid intermediate member having longitudinally opposite ends received in said openings for transmitting torque between said end members, resiliently yieldable liners being disposed in said end member openings and presenting respective opposed diametrically directed seatings into which the longitudinally opposite ends of the intermediate member are inserted and removed transversely, said liners permitting relative pivoting movement between the intermediate member and its adjacent end member about axes transverse to an axis extending between each end of said longitudinally opposite ends of the intermediate member and transmitting torque loads between the members by compression of the resilient material between the intermediate member and each end member, retaining means between the intermediate member and each end member permitting said relative pivoting movement but limiting translational displacement between the members.

* * * * *